United States Patent
Schmidt et al.

(10) Patent No.: US 8,934,951 B2
(45) Date of Patent: Jan. 13, 2015

(54) ARRANGEMENT WITH AT LEAST ONE SUPERCONDUCTIVE CABLE

(71) Applicant: Nexans, Paris (FR)

(72) Inventors: Frank Schmidt, Langenhagen (DE); Mark Stemmle, Hannover (DE)

(73) Assignee: Nexans, Paris (FR)

(\*) Notice: Subject to any disclaimer, the term of this patent is extended or adjusted under 35 U.S.C. 154(b) by 0 days.

(21) Appl. No.: 13/960,970

(22) Filed: Aug. 7, 2013

(65) Prior Publication Data
US 2014/0051582 A1   Feb. 20, 2014

(30) Foreign Application Priority Data
Aug. 14, 2012 (EP) .................................... 12306001

(51) Int. Cl.
H01L 39/24 (2006.01)
H01B 12/16 (2006.01)
H01B 12/14 (2006.01)

(52) U.S. Cl.
CPC ............... *H01B 12/16* (2013.01); *H01B 12/14* (2013.01); *Y02E 40/647* (2013.01)
USPC .......................................... 505/230; 505/150

(58) Field of Classification Search
USPC .................................................. 505/150, 230
See application file for complete search history.

(56) References Cited

U.S. PATENT DOCUMENTS

| 2008/0192392 A1* | 8/2008 | Folts et al. ...................... 361/19 |
| 2008/0293575 A1* | 11/2008 | Hirose et al. .................. 505/230 |
| 2012/0040841 A1 | 2/2012 | Soika et al. |

\* cited by examiner

*Primary Examiner* — Paul Wartalowicz
(74) *Attorney, Agent, or Firm* — Sofer & Haroun, LLP

(57) ABSTRACT

An arrangement with at least one superconductive cable (4) and a first cryostat (K1) surrounding the cable. A second cryostat (K2) is formed around the first cryostat (K1) coaxially with and at a distance from the first cryostat (K1) for conducting a second cooling agent therethrough. The second cryostat (K2) is composed of two pipes (12, 13) which are arranged coaxially and at a distance from each other and, where a thermal insulation (14) is enclosed between the pipes, and where during operation of the arrangement a liquefied gas, having a temperature of 112K or less, is conducted through the cryostat (K2).

2 Claims, 1 Drawing Sheet

ARRANGEMENT WITH AT LEAST ONE SUPERCONDUCTIVE CABLE

RELATED APPLICATION

This application claims the benefit of priority from European Patent Application No. 12 306 001.4, filed on Aug. 14, 2012, the entirety of which is incorporated by reference.

BACKGROUND

1. Field of the Invention

The invention relates to an arrangement with at least one superconductive cable and a first cryostat surrounding the superconductive cable for conducting a first cooling agent therethrough, wherein the cryostat is composed of at least one thermally insulated pipe, and wherein the cryostat encloses a hollow space over its entire length in which the cable is arranged and through which the first cooling agent is conducted during operation of the arrangement (EP 2 234 122 B1).

2. Description of Related Art

A superconductive cable includes electrical conductors of a material which changes over into the superconductive state at sufficiently low temperatures. The electrical direct current resistance of a correspondingly constructed conductor is zero with sufficient cooling as long as a certain current, the critical current, is not exceeded. Suitable materials are, for example oxidic materials on the basis of rare earths (ReBCO), particularly YBCO (yttrium-barium-copper oxide), or BSCCO (bismuth-strontium-calcium-copper oxide). Sufficiently low temperatures for bringing such a material into the superconductive state are, for example, between 67K and 110K. Suitable cooling agents are for example, nitrogen, helium, neon and hydrogen or mixtures of these materials. Since the stated temperatures are significantly above the absolute zero point of −273.16° C.=0K, conductors of corresponding materials are called high temperature superconductors (HTS). This is also true for other superconductive materials such as, for example magnesium diboride which change over into the superconductive state at temperatures of about 39K or lower which are also significantly above 0K.

EP 2 234 122 B1 mentioned in the beginning discloses an arrangement in which a superconductive cable is arranged in a cryostat. The cryostat consists of two pipes of metal arranged concentrically and at a distance from each other, wherein the pipes enclose between each other a thermal insulation constructed as vacuum insulation. The oxidic materials already mentioned above are used as superconductive materials on the basis of rare earths. For example for cooling the cable, liquid nitrogen is used which can be kept at a sufficiently low cooling temperature over a longer period of time with a conventional vacuum insulated cryostat. Liquid nitrogen cannot be used for lower temperatures which are below 63K because it changes into a solid state at these temperatures. In addition, for a cooling agent which is at a correspondingly cool temperature, it is more difficult to keep the cooling agent cool, over a longer period of time.

OBJECTS AND SUMMARY

The invention is based on the object of constructing the arrangement described above in such a way that it can also be used in a simple manner for superconductive materials which must be cooled to a temperature of 39K or lower for achieving the superconductive state.

In accordance with the invention, this object is met in that magnesium diboride is used as superconductive material, a liquid or gaseous cooling agent cooled to a temperature of 39K or lower is used as the first cooling agent, and a second cryostat for conducting a second cooling agent therethrough is shaped coaxially around the first cryostat and at a distance from the first cryostat, wherein the second cryostat is composed of two pipes which are arranged coaxially and at a distance from each other and enclose a thermal insulation therebetween, and wherein liquefied gas, having a temperature of 112K or lower, is conducted through the second cryostat.

In this arrangement magnesium diboride, which is less expensive than the oxidic superconductive materials, can be used as the superconductive material. Compared to oxidic materials, this material has a higher current carrying capacity. The arrangement is overall of relatively simple construction. In the simplest embodiment, the first cryostat consists of only one thermally insulated pipe and the second cryostat can be shaped around the first cryostat using conventional technology. The presence of the second cryostat means that even for the cooling agent conducted in the first cryostat, there is an increased protection against external heat exposure. This screening effect of the second cryostat is substantially increased by the liquefied gas which is conducted through the second cryostat during operation of the arrangement. Liquefied nitrogen is advantageously used as liquefied gas. As a result, the second cryostat in its totality, has the effect of a heat shield for the first cryostat, so that the cooling agent conducted therethrough can be kept at a sufficiently low cooling temperature over a relatively long distance along which the arrangement is located.

A high voltage proof insulation is advantageously mounted in the second cryostat which encloses the first cryostat completely and which rests, for example, on the thermal insulation of the first cryostat or a pipe enclosing the insulation. The liquid nitrogen flows around and impregnates this insulation and has significantly improved dielectric values.

An embodiment of the subject matter of the invention is illustrated in the drawings.

DETAILED DESCRIPTION

Suitable as first cooling agents are, for example, liquid hydrogen with a cooling temperature of about 20.28K, liquid neon with a cooling temperature of about 27.07K and helium as with a cooling temperature of 39K or lower. In the following, helium gas is taken into consideration as the first cooling agent representative of all suitable cooling agents.

Figure 1:
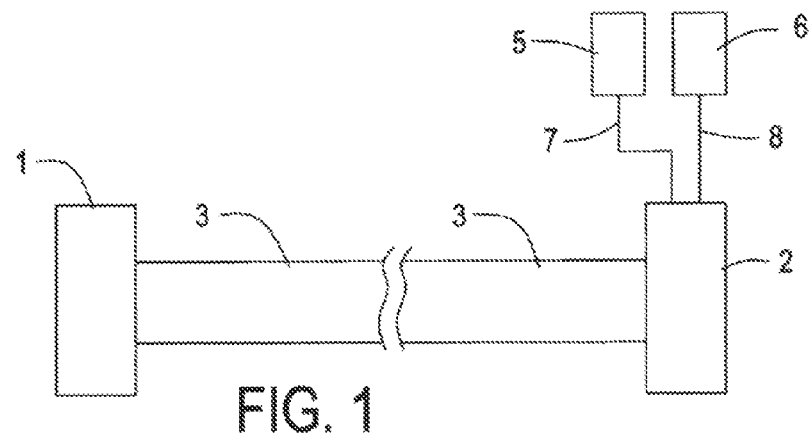
FIG. 1 schematically shows a transmission length for electrical energy with an arrangement according to the invention.
Figure 2:
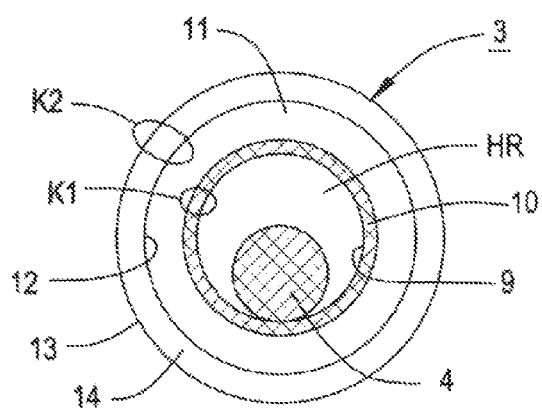
FIG. 2 shows a cross sectional view of the arrangement according to the invention, on a larger scale.
Figure 3:
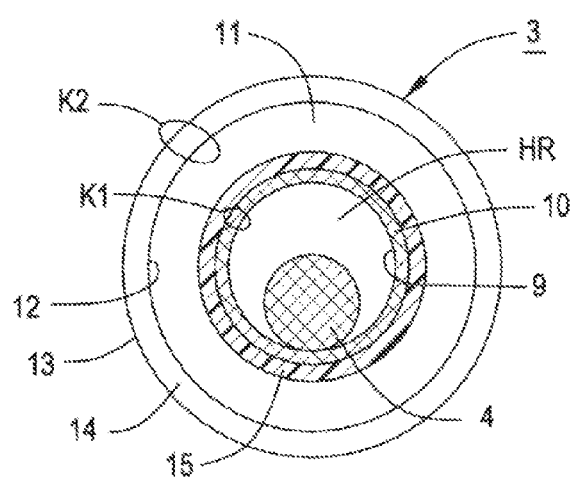
FIG. 3 shows a supplemented embodiment of the arrangement as compared to FIG. 2, also in a sectional view.

The transmission length according to FIG. 1 has two end closures 1 and 2 between which an arrangement 3 is mounted, having at least one superconductive cable 4 (FIGS. 2 and 3). The transmission length may have a length of, for example, 600 m. Also, at least one connecting point for connecting always two arrangements 3 may also be mounted along the transmission length. The superconductive cable 4 may be connected in the end closures 1 and 2 in accordance with known technology to electrical elements. In the illustrated embodiment, the end closure 2 is connected to two supply containers 5 and 6 which contain a cooling agent each. Helium gas is advantageously contained in the supply container 5, while the supply container 6 advantageously contains liquid nitrogen. The cooling agents are conducted through pipe lines 7 and 8 into the end closure 2 and are conducted in accordance with known technology by means of pumps under pressure into two cryostats K1 and K2 (FIGS. 2 and 3) which surround the cable 4.

Supply containers for cooling agents can also be present at the end closure 1 and possibly at a connection location. For adhering to or maintaining the low temperature for the helium gas, a suitable cooling plant is used and the helium gas is moved advantageously through the arrangement in a circuit.

In the arrangement according to FIG. 2, a superconductive cable 4 is schematically shown whose construction is essentially optional and is known in multiple configurations. Magnesium diboride is used in the cable 4 as superconductive material for the conductor thereof and possibly also for a screen. The cable 4 may serve for transmitting electrical energy in the middle voltage range (approximately starting at one kV) and in the high voltage range (starting approximately at 80 kV).

The cable 4 is surrounded by a first cryostat K1 which consists of a pipe 10 which is surrounded by a thermal insulation 9. The thermal insulation 9 has the purpose of protecting the interior space of the first cryostat K1 against sudden external heat exposure. It may consist of conventional materials serving for thermal insulation with an outer surface which is as smooth and closed as much as possible so that no moisture can penetrate. This is also true, for example, for a foamed material which in that case should be constructed with a closed outer surface, a so-called "skin." The pipe 10 may consist of metal, but also of a stable synthetic material. An additional pipe which may also consist of metal or synthetic material may be mounted. over the insulation 9. The insulation 9 would then not require a smooth outer surface. In addition, two or more superconductive cables may be arranged in the first cryostat K1.

The first cryostat K1 encloses a hollow space HR in which the cable 4 is arranged and through which helium gas is pumped out of the supply container 5 during the operation of the arrangement. During operation of the arrangement the superconductive material, the magnesium diboride, is cooled to a temperature of 39K or lower.

While maintaining a concentric intermediate space 11, a second cryostat K2 is mounted around the first cryostat K1, wherein the second cryostat K2 is composed of two pipes 12 and 13 of metal which are arranged concentrically and at a distance from each other, wherein the pipes enclose a vacuum insulation 14 therebetween. A spacer member is also located between the pipes 12 and 13.

During operation of the arrangement, liquid nitrogen is pumped as the second cooling agent through the second cryostat K2, accordingly through the intermediate space 11, out of the supply container 6. As a result the intermediate space 11 is cooled, for example, to about 67K to 77K. However, LNG, cooled to a temperature of at least 112K or liquid oxygen which has been cooled to a temperature of at least 90K, can be used as the second cooling agent. The second cooling agent, preferably the liquid nitrogen which is taken into consideration in the following, constitutes together with the second cryostat K2, an effective heat. shield for the first cryostat K1 so that the helium gas conducted through the first cryostat K1 is protected against a heating which is too rapid by the sudden external heat.

The insulation of the dielectric of the cable 4 can basically be mounted directly around the conductor of the cable. However, it is advantageously also possible to arrange the insulation 15 or the dielectric of the cable 4 in the intermediate space 11, for example, as a layer of a high voltage proof insulating material which completely surrounds the first cryostat K1, wherein the insulation material rests on the insulation 9 or on a pipe surrounding the cryostat K1. For example paper, or synthetic material coated with paper, can be used as insulating material for the insulation 15.

The liquid nitrogen flows around the insulation 15 in the intermediate space 11 and is also impregnated with the nitrogen, which results in an increased dielectric strength of the insulation. All elements of metal surrounded by the insulation 15 are at a potential with increased voltage, advantageously at high voltage potential. If a superconductive cable 4 with a superconductive screen is used, the screen is arranged above the insulation 15 in the intermediate space 11. Oxidic superconductive materials are advantageously used for the screen.

If, for the high voltage proof insulation 15 a material is used which simultaneously also has thermally insulating properties, the insulations 9 and 15, illustrated in the embodiments of the arrangement could then also be composed of only one layer which rests on the pipe 10 of the first cryostat K1.

The invention claimed is:

1. Superconductive arrangement comprising:
   at least one superconductive cable having a superconductive material; and
   a first cryostat surrounding the superconductive cable for conducting a first cooling agent therethrough, said first cryostat being composed of at least one thermally insulated pipe which encloses a hollow space over its entire length in which the superconductive cable is arranged and through which the first cooling agent is conducted during operation of the arrangement,
   wherein magnesium diboride is used as said superconductive material,
   wherein a liquid or gaseous cooling agent cooled to a temperature of 39K or lower is used as the first cooling agent, and
   wherein a second cryostat is arranged coaxially around the first cryostat, and at a distance from the first cryostat,
   wherein the second cryostat is composed of two pipes arranged coaxially to each other and at a distance from each other, and wherein the pipes enclose a thermal insulation therebetween and through which during operation of the arrangement a liquefied gas, having a temperature of 112K or less, is conducted and wherein a high voltage proof insulation is arranged in the intermediate space between the first cryostat and the second cryostat, which completely encloses the first cryostat and abuts to the thermally insulated pipe of said first cryostat and the liquid nitrogen flows around and impregnates this high voltage proof insulation during operation of the arrangement, causing significantly improved dielectric values.

2. Arrangement according to claim 1, wherein helium gas is used as the first cooling agent.

* * * * *